US010612415B2

United States Patent
Duong (10) Patent No.: US 10,612,415 B2
(45) Date of Patent: Apr. 7, 2020

(54) FLUID COMMUNICATION BETWEEN A STATIONARY STRUCTURE AND A ROTATING STRUCTURE

(71) Applicant: United Technologies Corporation, Farmington, CT (US)

(72) Inventor: Hung Duong, Unionville, CT (US)

(73) Assignee: United Technologies Corporation, Farmington, CT (US)

( * ) Notice: Subject to any disclaimer, the term of this patent is extended or adjusted under 35 U.S.C. 154(b) by 225 days.

(21) Appl. No.: 15/689,412

(22) Filed: Aug. 29, 2017

(65) Prior Publication Data

US 2019/0063317 A1 Feb. 28, 2019

(51) Int. Cl.
| | |
|---|---|
| F01D 25/20 | (2006.01) |
| F01M 1/00 | (2006.01) |
| F16N 25/04 | (2006.01) |
| F04D 29/54 | (2006.01) |
| F01M 1/02 | (2006.01) |
| F16N 13/20 | (2006.01) |
| F02C 7/36 | (2006.01) |

(52) U.S. Cl.
CPC ............... *F01D 25/20* (2013.01); *F01M 1/00* (2013.01); *F04D 29/545* (2013.01); *F16N 25/04* (2013.01); *F01M 2001/0238* (2013.01); *F02C 7/36* (2013.01); *F05D 2260/602* (2013.01); *F16N 13/20* (2013.01); *F16N 2210/02* (2013.01)

(58) Field of Classification Search
CPC .... F02C 7/04; F02C 7/36; F01D 25/20; F01D 25/18; F01M 1/00; F01M 2001/0238; F04D 29/545; F04D 29/063; F16N 25/04; F16N 13/20; F16N 2210/02; F05D 2260/602; F05D 2260/98

USPC .......................................................... 415/112
See application file for complete search history.

(56) References Cited

U.S. PATENT DOCUMENTS

| | | | | |
|---|---|---|---|---|
| 2,878,894 | A * | 3/1959 | Andrews | F16C 33/6659 184/6.9 |
| 3,243,243 | A * | 3/1966 | Diver | F01D 25/18 384/465 |
| 3,312,448 | A * | 4/1967 | Huil, Jr. | F01D 9/065 184/6 |
| 4,023,661 | A * | 5/1977 | Flotow | F16D 13/48 192/113.34 |
| 4,453,784 | A * | 6/1984 | Kildea | F01D 25/18 184/6.11 |

(Continued)

FOREIGN PATENT DOCUMENTS

DE 102012011502 A1 12/2013

OTHER PUBLICATIONS

EP search report for EP18191521.6 dated Jan. 30, 2019.

*Primary Examiner* — Kenneth J Hansen
*Assistant Examiner* — Eric J Zamora Alvarez
(74) *Attorney, Agent, or Firm* — Getz Balich LLC (57) ABSTRACT

An assembly for rotational equipment includes a stationary structure and a rotating structure. The stationary structure is configured with a first fluid conduit. The rotating structure is configured with a second fluid conduit and a fluid scoop for the second fluid conduit. The second fluid conduit is fluidly coupled with the first fluid conduit through an annular plenum formed by and radially between the stationary structure and the rotating structure. The fluid scoop projects radially into the annular plenum.

18 Claims, 8 Drawing Sheets

(56) References Cited

U.S. PATENT DOCUMENTS

| | | | | |
|---|---|---|---|---|
| 4,648,485 | A * | 3/1987 | Kovaleski | F01D 25/18 |
| | | | | 184/13.1 |
| 5,080,555 | A * | 1/1992 | Kempinger | F01D 9/065 |
| | | | | 415/108 |
| 5,114,446 | A * | 5/1992 | Giersdorf | F01D 25/18 |
| | | | | 55/345 |
| 5,119,905 | A | 6/1992 | Murray | |
| 5,454,646 | A * | 10/1995 | Reisdorf | F01D 25/164 |
| | | | | 384/901 |
| 5,609,073 | A * | 3/1997 | Spooner | F16H 48/147 |
| | | | | 184/11.2 |
| 6,098,753 | A | 8/2000 | Lamarre et al. | |
| 6,409,464 | B1 * | 6/2002 | Fisher | F01D 25/16 |
| | | | | 384/475 |
| 6,966,700 | B2 * | 11/2005 | Weissbacher | F16C 17/02 |
| | | | | 384/313 |
| 7,124,857 | B2 * | 10/2006 | Gekht | F01D 25/16 |
| | | | | 184/11.2 |
| 7,762,724 | B2 * | 7/2010 | Yoshimura | F01C 21/02 |
| | | | | 384/291 |
| 9,683,458 | B2 * | 6/2017 | Lefebvre | F16C 33/6659 |
| 10,113,429 | B2 * | 10/2018 | McDonagh | F01D 5/085 |
| 2006/0213726 | A1 | 9/2006 | Gekht et al. | |
| 2014/0099199 | A1 * | 4/2014 | Kerr | F16C 33/6677 |
| | | | | 415/229 |
| 2016/0003090 | A1 | 1/2016 | Lin | |
| 2016/0032769 | A1 | 2/2016 | Stutz et al. | |
| 2016/0281527 | A1 | 9/2016 | Lucas | |

* cited by examiner

FLUID COMMUNICATION BETWEEN A STATIONARY STRUCTURE AND A ROTATING STRUCTURE

BACKGROUND OF THE DISCLOSURE

1. Technical Field

This disclosure relates generally to rotational equipment and, more particularly, to communicating fluid between a stationary structure and a rotating structure of the rotational equipment.

2. Background Information

Various techniques are known in the art for communicating fluid from a stationary structure to a rotating structure such as a gas turbine engine. While these known techniques have various benefits, there is still room in the art for improvement.

SUMMARY OF THE DISCLOSURE

According to an aspect of the present disclosure, an assembly is provided for rotational equipment. This assembly includes a stationary structure and a rotating structure. The stationary structure is configured with a first fluid conduit. The rotating structure is configured with a second fluid conduit and a fluid scoop for the second fluid conduit. The second fluid conduit is fluidly coupled with the first fluid conduit through an annular plenum formed by and radially between the stationary structure and the rotating structure. The fluid scoop projects radially into the annular plenum.

According to another aspect of the present disclosure, an assembly is provided for rotational equipment. This assembly includes a stationary structure, a hub, a first shaft and a second shaft. The stationary structure is configured with a first fluid conduit. The hub is configured with a second fluid conduit and a fluid scoop at an inlet of the second fluid conduit. The second fluid conduit is fluidly coupled with the first fluid conduit through an annular plenum that extends radially from the rotating structure to the stationary structure. The fluid scoop projects radially into the annular plenum. The fluid scoop is adapted to direct fluid, which is received within the annular plenum from the first fluid conduit, into the second fluid conduit. The first shaft is connected to the second shaft through the hub.

The scoop may substantially fluidly divide the annular plenum into a pair of circumferentially adjacent sub-plenums.

The fluid scoop may be adapted to direct fluid, within the annular plenum, into the second fluid conduit. The annular plenum may be adapted to receive the fluid therewithin from the first fluid conduit.

The fluid scoop may be arranged at an inlet of the second fluid conduit.

The fluid scoop may have a tubular body with a beveled edge portion.

The rotating structure may be configured as or otherwise include a hub. The fluid scoop may have a projection that projects out from the tubular body and into a slot in the hub.

The first fluid conduit may extend radially within the stationary structure to an outlet orifice in a radial inner surface of the stationary structure. The second fluid conduit may extend radially within the rotating structure to an inlet orifice in a radial outer surface of the rotating structure. The annular plenum may extend radially from the radial inner surface to the radial outer surface.

The assembly may include a fluid nozzle configured and rotatable with the rotating structure. The fluid nozzle may be fluidly coupled with an outlet of the second fluid conduit.

The rotating structure may be further configured with a third fluid conduit and a second fluid scoop for the third fluid conduit. The third fluid conduit may be fluidly coupled with the first fluid conduit through the annular plenum. The second fluid scoop may project radially into the annular plenum.

The assembly may also include a fluid device fluidly coupled with the second fluid conduit and the third fluid conduit.

The rotating structure may include a first shaft, a second shaft and a hub. The hub may connect the first shaft to the second shaft and may include the second fluid conduit and the fluid scoop.

The hub may also include a fluid nozzle fluidly coupled with an outlet of the second fluid conduit.

The rotating structure may include a first rotating assembly that includes the first shaft and a rotor configured with a plurality of rotor blades.

The assembly may also include a gas turbine engine and a transmission connected to the second shaft. The gas turbine engine may include the first shaft.

The assembly may include a generator driven by the second shaft through the transmission.

The assembly may include a gas turbine engine and a device connected to and driven by the second shaft. The gas turbine engine includes the first shaft. The device is arranged outside of the gas turbine engine.

The assembly may also include a seal device adapted to substantially seal an annular gap between the stationary structure and the rotating structure.

The seal device may be configured as or otherwise include an O-ring.

The assembly may include a second seal device adapted to substantially seal a second annular gap between the stationary structure and the rotating structure. The annular plenum may be located axially, relative to a rotational axis of the rotating structure, between the seal device and the second seal device.

The foregoing features and the operation of the invention will become more apparent in light of the following description and the accompanying drawings.

DETAILED DESCRIPTION

Figure 1:
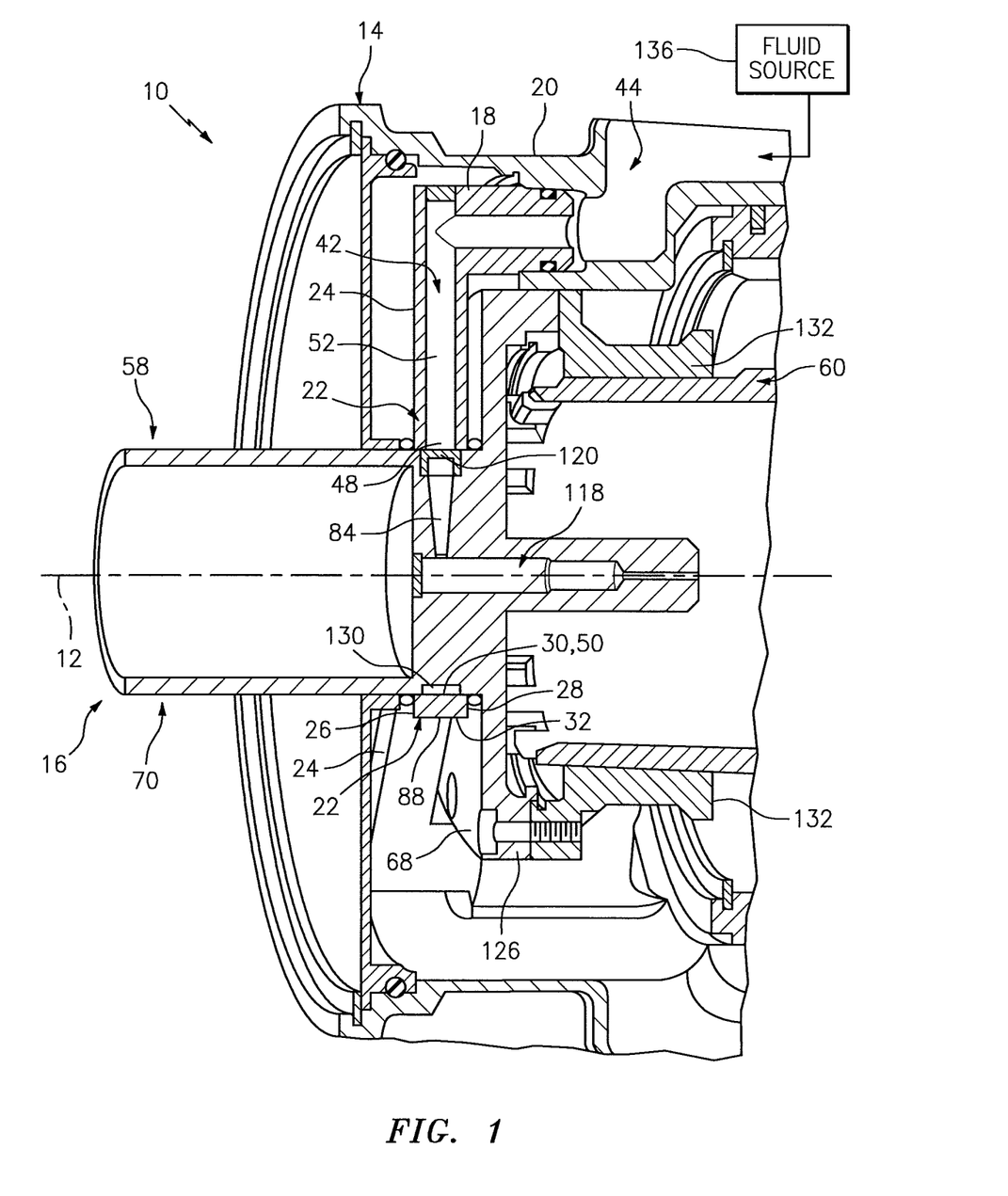
FIG. 1 is a perspective side sectional illustration of portions of a rotating structure and a stationary structure of a piece of rotational equipment.

FIG. 1 illustrates an assembly 10 for rotational equipment with an axis 12; e.g., a rotational axis. An example of such rotational equipment is an industrial gas turbine engine, an example of which is described below in further detail. However, the assembly 10 of the present disclosure is not limited to such an industrial or gas turbine engine application. The assembly 10, for example, may alternatively be configured with rotational equipment such as an aircraft gas turbine engine, a wind turbine, a water turbine or any other apparatus in which fluid is communicated between a stationary structure and a rotating structure.

The rotational equipment assembly 10 of FIG. 1 includes a stationary structure 14 and a rotating structure 16. The stationary structure 14 includes a fluid manifold 18, which may be mounted to another component 20 of the stationary structure 14 such as, but not limited to, a casing or a frame. The fluid manifold 18 includes an annular manifold base 22 (see also FIG. 2) and one or more manifold aims 24.

The manifold base 22 extends circumferentially around the axis 12 thereby providing the manifold base 22 with a full hoop body. The manifold base 22 extends axially along the axis 12 between an axial first end 26 and an axial second end 28. The manifold base 22 extends radially between a radial inner side 30 and a radial outer side 32.

Figure 2:
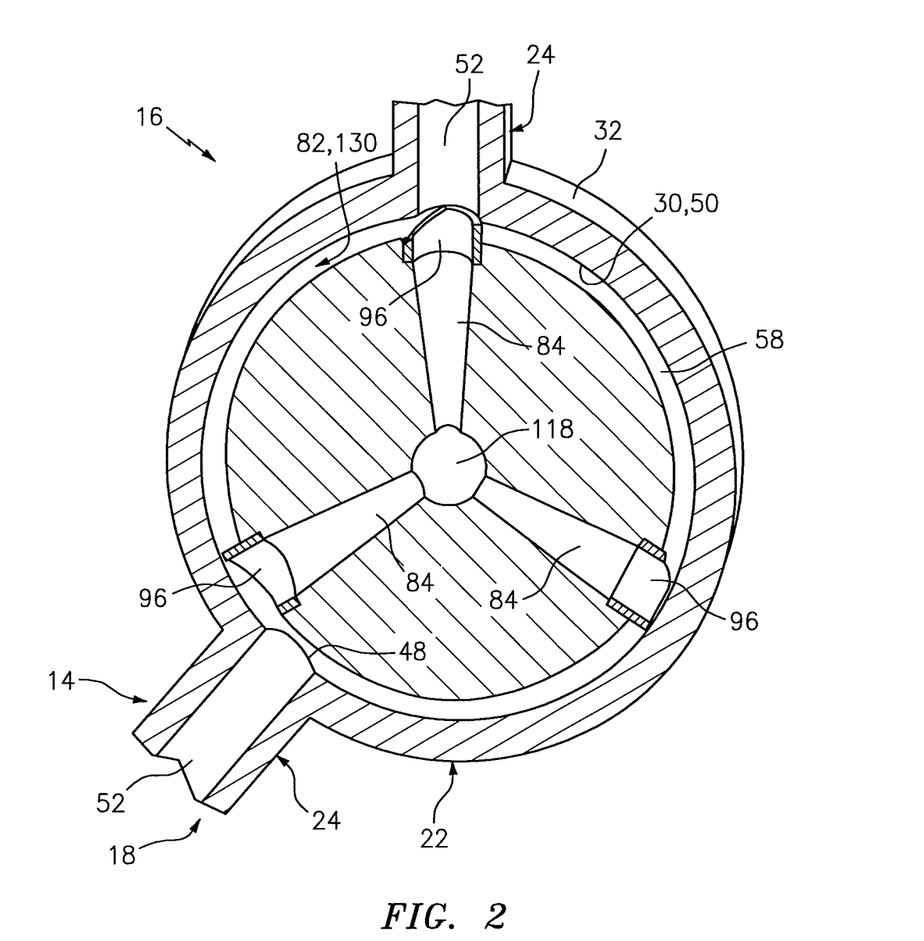
FIG. 2 is a perspective cross-sectional illustration of another portion of the rotational equipment.
Figure 3:
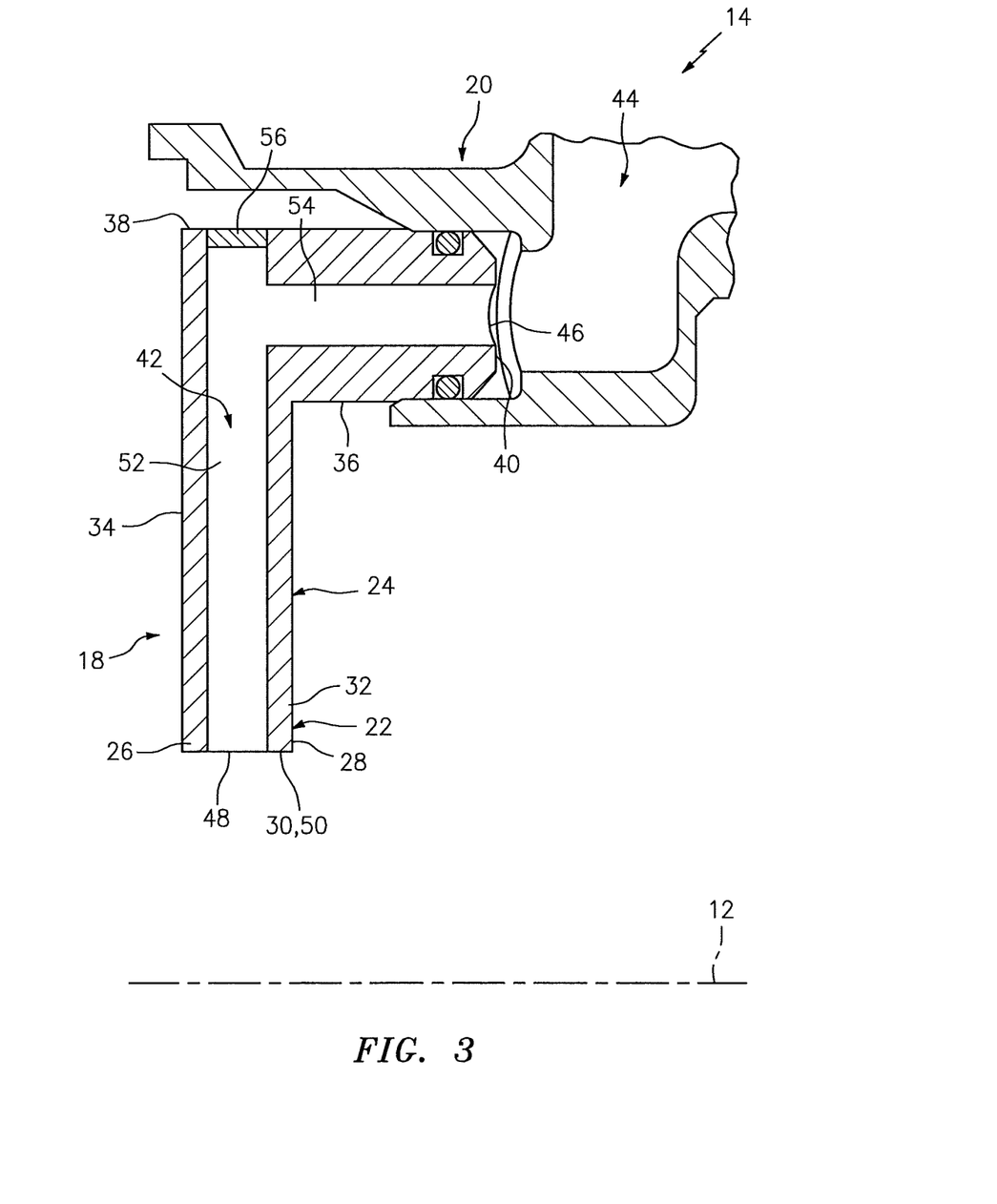
FIG. 3 is a perspective side sectional illustration of a portion of the stationary structure.

The manifold arms 24 are arranged circumferentially about and connected to (e.g., formed integral with) the manifold base 22; see also FIG. 2. Referring to FIG. 3, each manifold arm 24 includes a tubular radial arm segment 34 and a tubular axial arm segment 36. The radial arm segment 34 projects radially out from the radial outer side 32 of the manifold base 22 to an outer radial distal end 38 thereof The axial arm segment 36 is arranged at (e.g., on, adjacent or proximate) the radial distal end 38 and is connected to (e.g., formed integral with) the radial arm segment 34. The axial arm segment 36 projects axially out from the radial arm segment 34 to an axial distal end 40 thereof This axial distal end 40 may be configured to mate with (e.g., be received within an aperture of) the other stationary structure component 20. In this manner, a fluid flow passage 42 associated with each manifold arm 24 may be fluidly coupled with and receive fluid from a respective fluid flow passage 44 in the other stationary structure component 20.

Each fluid flow passage 42 of FIG. 3 extends within the fluid manifold 18 between a respective inlet orifice 46 and a respective outlet orifice 48. The inlet orifice 46 is located at the respective axial distal end 40. The inlet orifice 46, for example, is formed in a surface on the axial distal end 40 of a respective one of the manifold arms 24. The outlet orifice 48 is formed in a radial inner surface 50 at the radial inner side 30 of the manifold base 22; see also FIG. 2.

Each fluid flow passage 42 of FIG. 3 is foil red by a radially extending conduit 52 and an axially extending conduit 54. The term "conduit" is used herein to describe a length of hose, a length of pipe, a line, a fluid coupling, a portion of a structure forming a through-bore, a portion of a structure forming a through-hole, or any other element or assembly of elements that form a flowpath capable of directing fluid from at least an inlet orifice to an outlet orifice. In the specific embodiment of FIG. 3, the radially extending conduit 52 is formed by the manifold base 22 and the radial arm segment 34, and extends within the fluid manifold 18 from the axially extending conduit 54 to the outlet orifice 48. The axially extending conduit 54 is formed by the axial arm segment 36, and extends within the fluid manifold 18 from the radially extending conduit 52 to the inlet orifice 46. With this arrangement, an interior bore of the axial arm segment 36 and an interior bore of the radial arm segment 34 are arranged sequentially inline with an aperture (e.g., a through-hole) in the manifold base 22 such that the bores and the aperture collectively define the respective fluid flow passage 42. The present disclosure, of course, is not limited to the foregoing exemplary fluid passage 42 arrangement or construction.

In the specific embodiment of FIG. 3, the interior bore of each radial arm segment 34 extends completely through that segment. To prevent the loss of fluid at the radial distal end 38, the interior bore may be capped with a plug 56, or alternatively fluidly coupled to another fluid flow passage (not shown). Of course, in other embodiments, the interior bore may be formed to only extend partially within the radial arm segment 34 such that the plug 56 is an integral part of that arm segment 34.

Figure 4:
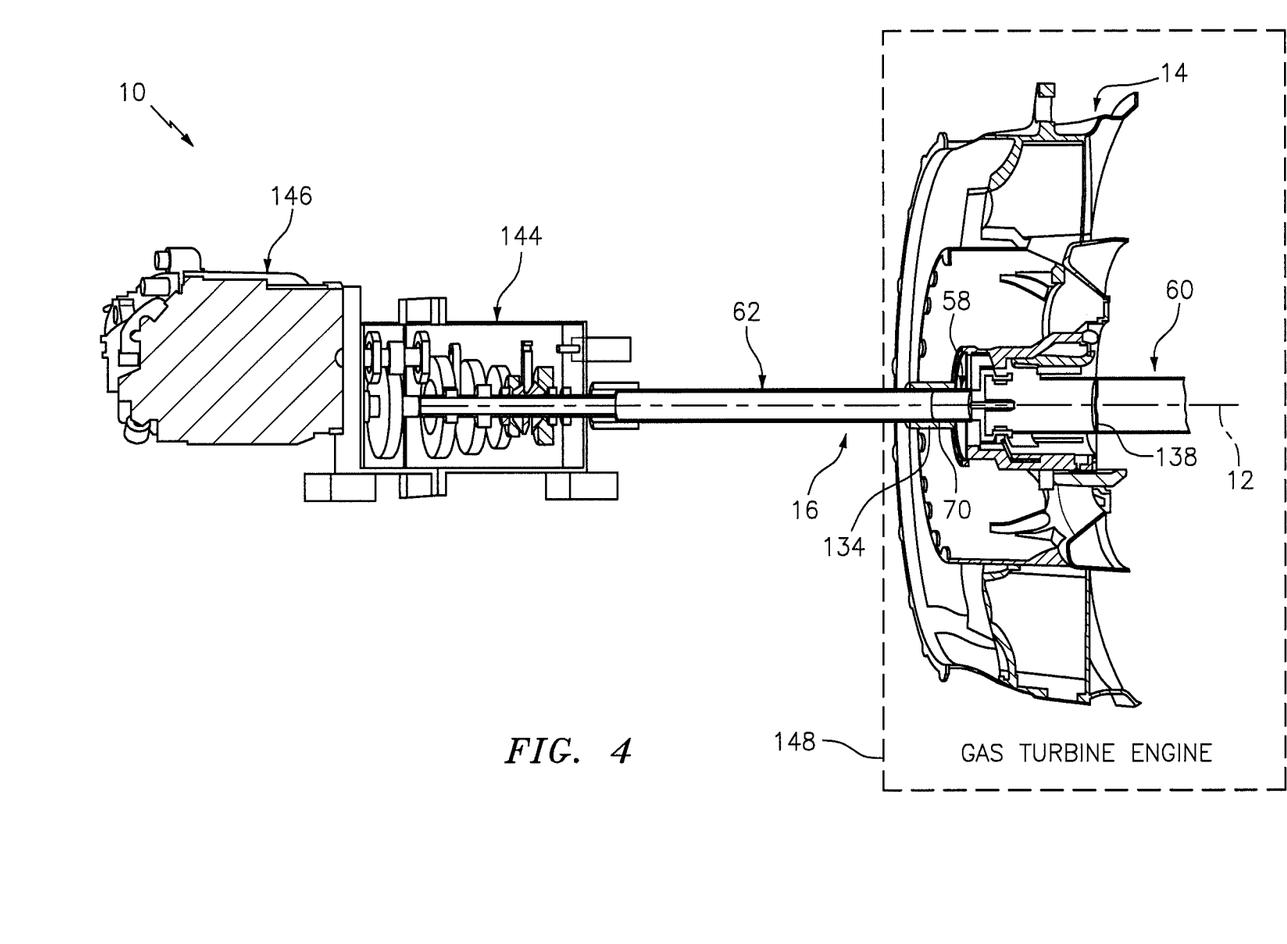
FIG. 4 is a perspective partial side cutaway illustration of another portion of the rotational equipment.

Referring to FIG. 4, the rotating structure 16 is configured to be rotatable as a single unit about the axis 12. The rotating structure 16 includes a hub 58 and one or more (e.g., tubular) shafts 60 and 62. The hub 58 is adapted to be axially between and fixedly connect the shaft 60 and the shaft 62 as described below in further detail.

Figure 5:
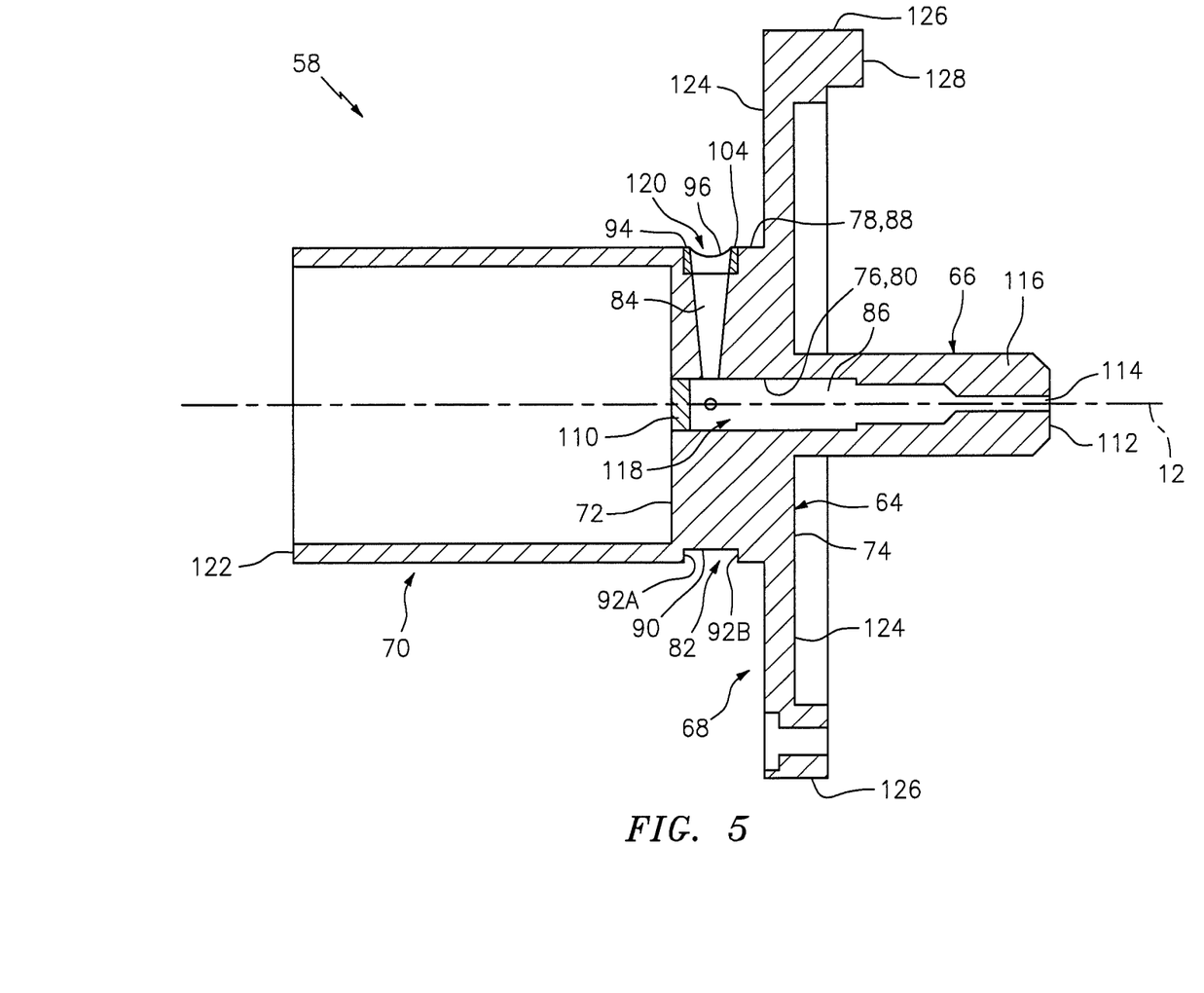
FIG. 5 is a side sectional illustration of a hub.

The hub 58 of FIG. 5 includes a (e.g., annular) hub base 64, a fluid device 66 and one or more (e.g., tubular) shaft couplers 68 and 70. The hub base 64 extends circumferentially around the axis 12 thereby providing the hub base 64 with a full hoop body. The hub base 64 extends axially along the axis 12 between an axial first end 72 and an axial second end 74. The hub base 64 extends radially between a radial inner side 76 and a radial outer side 78, where a surface 80 at the radial inner side 76 forms a central bore in the hub base 64.

Referring to FIG. 2, the hub base 64 is configured with a generally annular channel 82 and one or more radial conduits 84. Referring to FIG. 5, the channel 82 extends radially into the hub base 64 from a radial outer surface 88 at the radial outer side 78 to a tubular (e.g., cylindrical) channel side surface 90. The channel 82 extends axially within the hub base 64 between opposing annular channel end surfaces 92A and 92B. Each radial conduit 84 extends radially within the hub base 64 from a respective inlet 94 adjacent the channel 82 to the central bore. Thus, the channel 82 is fluidly coupled with the central bore through the radial conduits 84. Each radial conduit 84 may have a tapering geometry such that a width (e.g., diameter) of the respective radial conduit 84 gradually decreases as that conduit 84 extends radially inward from the channel 82 to the central bore. However, in other embodiments, at least a portion or substantially all of the radial conduit may have a substantially constant width.

The hub base 64 is also configured with or otherwise includes one or more fluid scoops 96, which scoops 96 are respectively associated with the radial conduits 84. Each fluid scoop 96 is located at (e.g., on, adjacent or proximate) the inlet 94 of a respective one of the radial conduits 84, which inlet 94 is in the radial outer surface 88 of the hub 58 (e.g., the channel side surface 90). For example, in the specific embodiment of FIG. 2, each fluid scoop 96 is received within the respective inlet 94.

Figure 6:
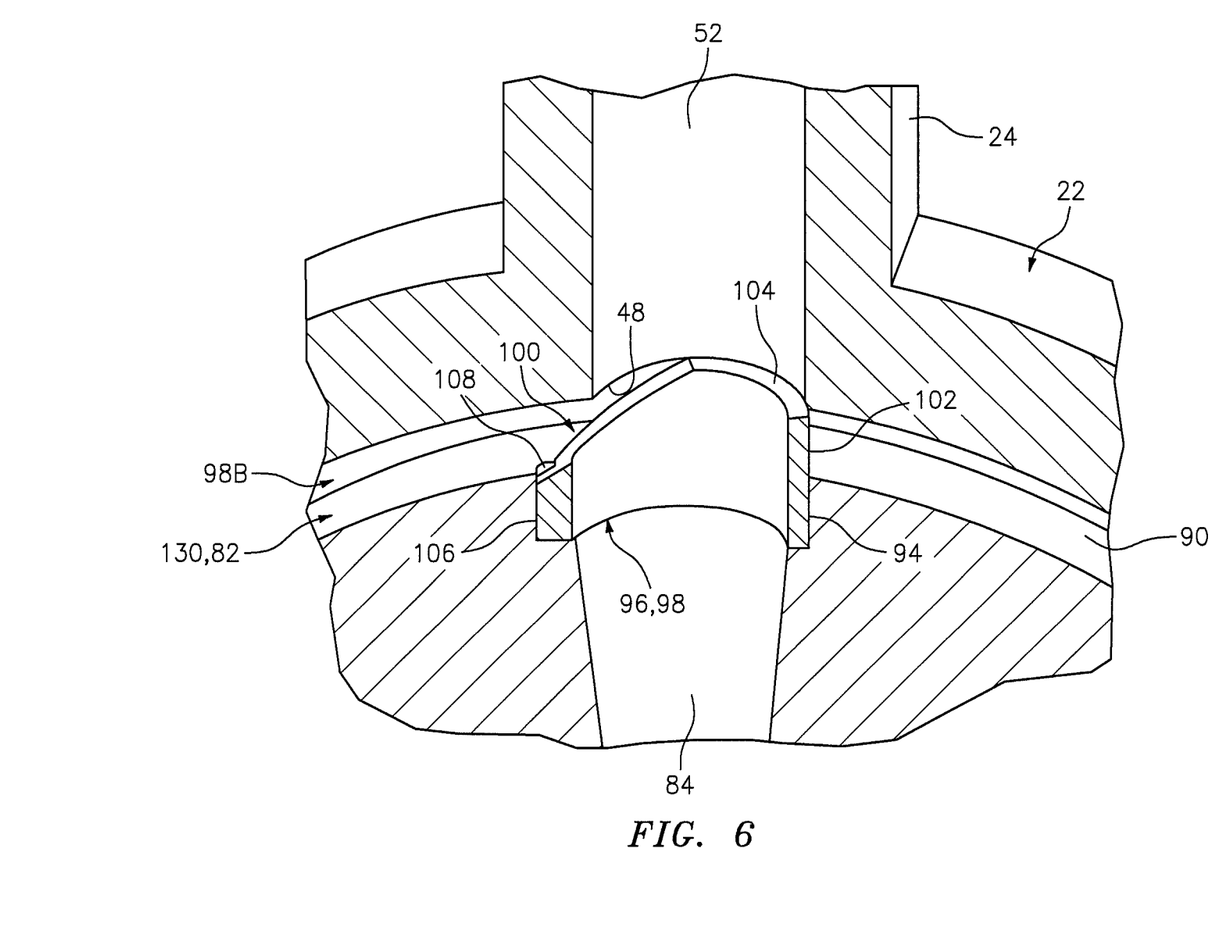
FIG. 6 is a perspective cross-sectional illustration of another portion of the rotational equipment.
Figure 7:
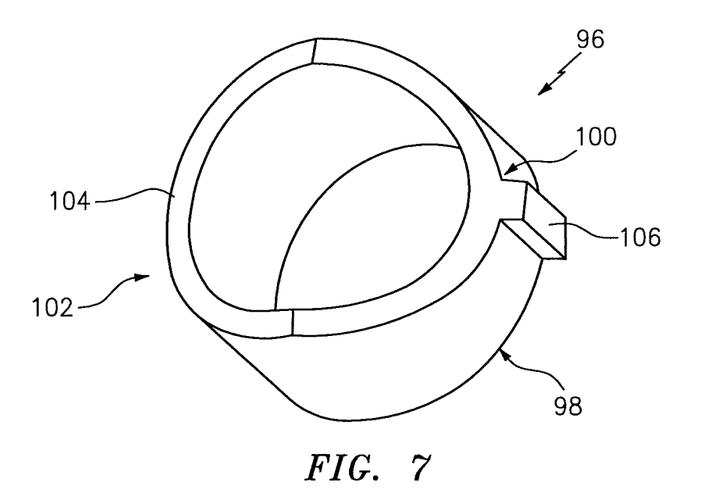
FIG. 7 is a perspective illustration of a fluid scoop.

FIG. 7 is a perspective illustration of the fluid scoop 97. This fluid scoop 96 (see also FIG. 6) has a tubular body 98 with a beveled edge portion 100. Referring to FIG. 6, with such an arrangement, the fluid scoop 96—proximate a center of the beveled edge portion 100—may be substantially radially flush with the channel side surface 90. A diametrically opposed portion 102 (e.g., a non-beveled portion) of the fluid scoop 96, by contrast, may project radially outward and away from the channel side surface 90 to a distal outer scoop tip 104. This scoop tip 104 may be substantially radially flush with (or slightly recessed radially inward from) the radial outer side 88; see FIG. 5.

The fluid scoop 96 of FIGS. 6 and 7 may also be configured with a projection 106. Referring to FIG. 6, the projection 106 projects out from the tubular body 98 and into a slot 108 in the hub base 64. The projection 106 therefore is adapted as an anti-rotation feature, which prevents the fluid scoop 96 from rotating within the fluid conduit 84. The projection 106 may also ensure the scoop 96 is properly installed with the hub base 64 during installation. It is worth noting, while the fluid scoop 96 is described and illustrated as a discrete body, in other embodiments the fluid scoop 96 may be formed as an integral portion of the hub 58.

Referring again to FIG. 5, the central bore of the hub base 64 extends completely through the hub base 64. To prevent the loss of fluid at an end of the central bore, the bore may be capped with a plug 110, or alternatively fluidly coupled to another fluid flow passage (not shown). Of course, in other embodiments, the central bore may be formed to only extend partially within the hub base 64 such that the plug 110 is an integral part of that hub base 64.

The fluid device 66 of FIG. 5 is configured as and, thus, referred to below for ease of description as a fluid nozzle. The fluid device 66 of the present disclosure, however, is not limited to such an exemplary embodiment. The fluid device 66, for example, may be configured as any type of device that receives and/or uses fluid during operation. The fluid device 66, for example, may be configured as a device that is actuated by fluid. The fluid device 66 may be configured as a device that is lubricated by fluid. The fluid device 66 may also or alternatively be configured as a device that is cooled by fluid.

Referring again to FIG. 5, the fluid nozzle 66 is disposed at the axial second end 74 and connected (e.g., formed integral with) the hub base 64. The fluid nozzle 66 projects axially out from the hub base 64 along the axis 12 out to an axial distal end 112. The fluid nozzle 66 is configured with an axial portion of the central bore and a nozzle orifice 114 at the axial distal end 112. The nozzle orifice 114 extends through an endwall 116 (e.g., a tip) of the fluid nozzle 66 and is fluidly coupled with the central bore.

With the foregoing configuration, the hub 58 is configured with a fluid flow passage 118. This fluid flow passage 118 extends through the hub 58 between one or more inlet orifices 120 and the nozzle orifice 114. Each inlet orifice 120 is located at a respective one of the inlets 94 and is formed by a respective one of the fluid scoops 96. The fluid flow passage 118 of FIG. 5 is collectively defined by the fluid scoops 96, the radial conduits 84, an axial conduit 86 formed by the central bore and the nozzle orifice 114. The present disclosure, of course, is not limited to the foregoing exemplary fluid passage arrangement or construction.

The shaft coupler 70 is disposed at the axial first end 72 and is connected (e.g., formed integral with) the hub base 64. The shaft coupler 70 of FIG. 5 is configured with a tubular body (e.g., a shaft segment), which projects axially out from the hub base 64 along the axis 12 to an axial distal end 122.

The shaft coupler 68 is disposed at the axial second end 74 and is connected (e.g., formed integral with) the hub base 64. The shaft coupler 68 of FIG. 5 includes a radial segment 124 and an axial segment 126. The radial segment 124 projects radially out from the radial outer side 78 to the axial segment 126. The axial segment 126 projects axially out from the radial segment 124 to an axial distal end 128.

Referring to FIG. 1, the hub 58 is mated with the fluid manifold 18. In particular, the hub base 64 is disposed within the manifold base 22 such that the radial outer surface 88 is opposite and in very close proximity with the radial inner surface 50. With this arrangement, an annular plenum 130 is formed in the channel 82 between the hub 58 and the manifold 18. More particularly, the plenum 130 extends radially between the surfaces 50 and 90 (see FIG. 8). The plenum 130 extends axially between the channel end surfaces 92A and 92B (see FIG. 8). The plenum 130 extends circumferentially around the axis 12 along the channel 82. The plenum 130 fluidly couples the fluid flow passages 42 with the fluid flow passage 118. In particular, the plenum 130 fluidly couples outlet orifices 48 and the fluid flow conduits 52 to the inlet orifices 120 and the fluid flow conduits 84, which outlet orifices 48 are in the radial inner surface 50 (see FIG. 3).

The shaft coupler 68 is configured to mechanically couple the hub 58 to the shaft 60. A nut 132 mated with the shaft 60, for example, is mechanically attached to the axial segment 126 (e.g., the annular lip) via a bolted connection. Of course, in other embodiments, the nut 132 or the shaft 60 may be mechanically attached to the shaft coupler 68 via a splined connection, a flanged connection, a toothed connection or any other suitable connection technique.

Referring to FIG. 4, the shaft coupler 70 is configured to mechanically couple the hub 58 to the shaft 62. The shaft 62, for example, may be mechanically attached to the shaft coupler via a sleeve 134 at a sleeved connection. Of course, in other embodiments, the shaft 62 may be mechanically attached to the shaft coupler 70 via a splined connection, a flanged connection, a toothed connection, a bolted connection or any other suitable connection technique.

During operation of the rotational equipment assembly 10 of FIG. 1, fluid such as lubricant is directed from a fluid source 136 (e.g., a reservoir and/or a pump) through the fluid flow passages 44 and into the fluid flow passages 42. Referring to FIG. 2, the fluid flow passages 42 direct (e.g., route) the fluid into the plenum 130. The fluid scoops 96, which project radially out from the hub base 64 and into the plenum 130 and may fluidly divide the plenum 130 into circumferentially adjacent sub-plenums, capture fluid within the plenum 130 as the rotating structure 16 rotates about the axis 12 and thereby forces fluid into the fluid conduits 84 and, thus, the fluid flow passage 118. Referring again to FIG. 1, the fluid flow passage 118 subsequently directs (e.g., routes) the fluid into the fluid nozzle 66, which sprays the fluid into a cavity within the shaft 60. This fluid spray may be used to lubricate and/or cool a shaft spline 138 (see FIG. 4) or any other device within the rotational equipment.

Figure 8:
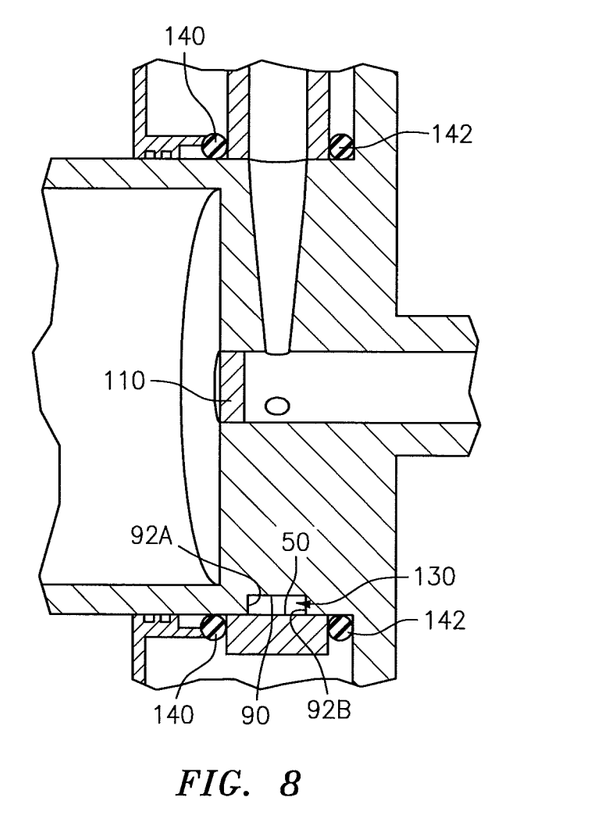
FIG. 8 is a side sectional illustration of an engagement between the hub and a fluid manifold.

In some embodiments, referring to FIG. 8, the rotational equipment assembly 10 may include one or more seal devices 140 and 142 (e.g., O-rings). The seal device 142 is adapted to substantially seal an annular gap (e.g., slight radial gap between the sides) between the hub 58 and the manifold 18. The seal device 142 is adapted to substantially seal an annular gap (e.g., slight radial gap between the sides) between the hub 58 and the manifold 18. The seal devices 140 and 142 are disposed on opposing axial sides of the plenum 130 and, thus, the plenum 130 is axially between the seal devices 140 and 142.

In some embodiments, referring to FIG. 4, the shaft 62 may be connected to a transmission 144, which may be connected to a generator 146. The transmission 144 is configured to transmit torque from the shaft 62 to a shaft of the generator 146. Thus, the shaft 62 is operable to drive rotation of the generator 146 through the transmission 144. The transmission 144 and the generator 146 may be located outside of an apparatus such as, but not limited to, a gas turbine engine 148. The shaft 62 may be configured with the gas turbine engine.

Figure 9:
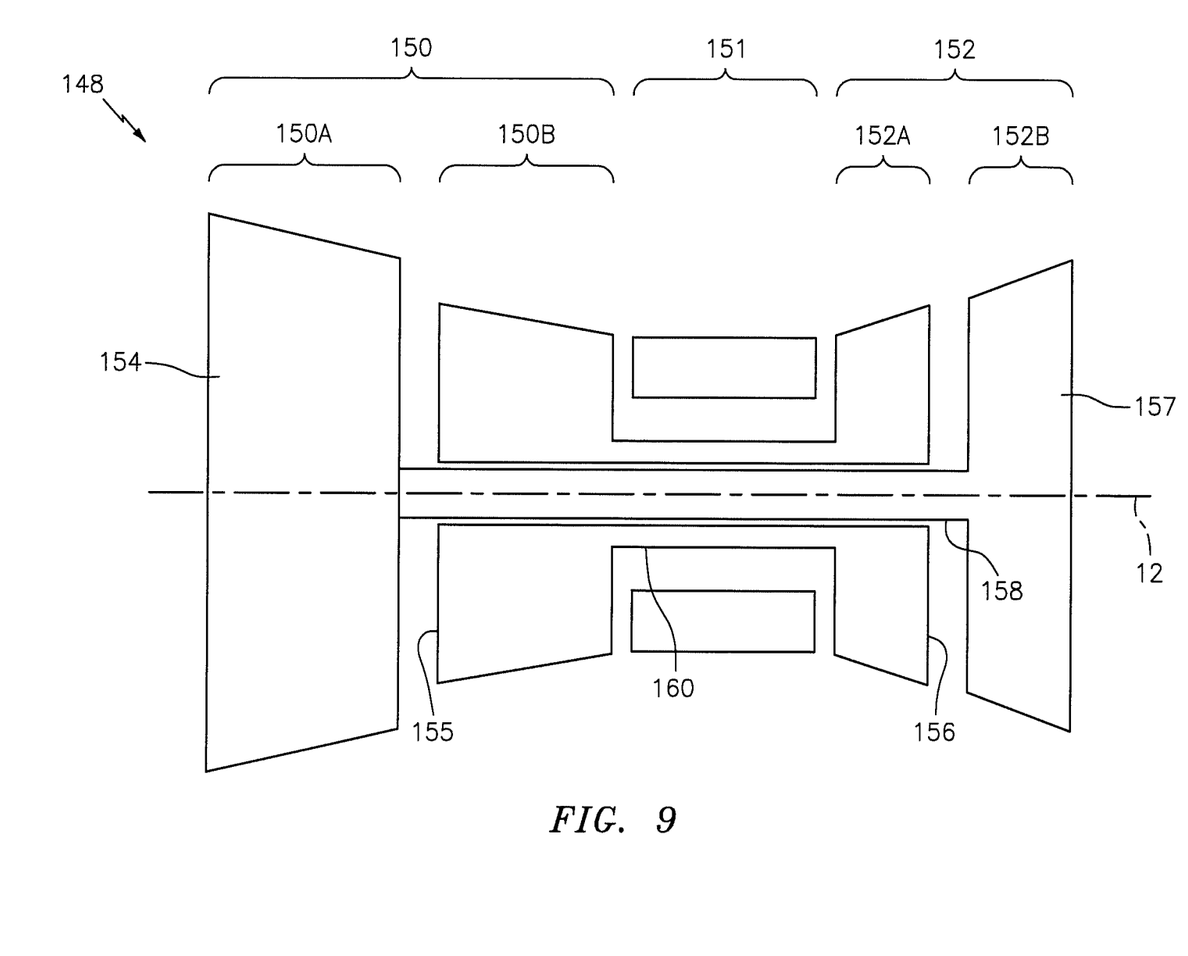
FIG. 9 is a schematic illustration of a gas turbine engine.

As described above, the rotational equipment assembly 10 of the present disclosure may be configured with a gas turbine engine 148. FIG. 9 illustrates one such exemplary gas turbine engine 148—a two spool industrial gas turbine engine. This turbine engine 148 includes various stationary structures and rotating structures, where the stationary structure 14 and the rotating structure 16 can respectively be configured as anyone of the foregoing structures in the turbine engine 148 of FIG. 9, or other structures not mentioned herein.

The gas turbine engine 148 of FIG. 9 includes a compressor section 150, a combustor section 151 and a turbine section 152. The compressor section 150 may include a low-pressure compressor (LPC) section 150A and a high-pressure compressor (HPC) section 150B. The turbine section 152 may include a high-pressure turbine (HPT) section 152A and a low-pressure turbine (LPT) section 152B.

Each of the engine sections 150A, 150B, 152A and 152B includes a respective rotor 154-157. Each of these rotors 154-157 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The LPC rotor 154 is connected to and driven by the LPT rotor 157 through a low speed shaft 158. The HPC rotor 155 is connected to and driven by the HPT rotor 156 through a high speed shaft 160. Either the low speed shaft 158 or the high speed shaft 160 may be configured as, or otherwise connected to, the shaft 60 (see FIG. 1).

During operation, air enters the turbine engine 148 through an airflow inlet. This air is directed into a core gas path which extends sequentially through the engine sections 150-152; e.g., an engine core. The air within the core gas path may be referred to as "core air".

The core air is compressed by the compressor rotors 154 and 155 and directed into a combustor in the combustor section 151. Fuel is injected into the combustor and mixed with the compressed core air to provide a fuel-air mixture. This fuel air mixture is ignited and combustion products thereof flow through and sequentially cause the turbine rotors 156 and 157 to rotate. The rotation of the turbine rotors 156 and 157 respectively drive rotation of the compressor rotors 155 and 154 and, thus, compression of the air received from a core airflow inlet.

The rotational equipment assembly 10 may be configured with various turbine engines other than the one described above as well as in other types of rotational equipment. The rotational equipment assembly 10, for example, may be configured with a geared turbine engine where a gear train connects one or more shafts to one or more rotors in a fan section, a compressor section and/or any other engine section. Alternatively, the rotational equipment assembly 10 may be configured with a turbine engine without a gear train. The rotational equipment assembly 10 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a stationary structure configured with a first fluid conduit; and
a rotating structure configured with a second fluid conduit and a fluid scoop for the second fluid conduit, the second fluid conduit fluidly coupled with the first fluid conduit through an annular plenum formed by and radially between the stationary structure and the rotating structure, and the fluid scoop projecting radially into the annular plenum;
the rotating structure comprising a first shaft, a second shaft and a hub; and
the hub connecting the first shaft to the second shaft, and the hub comprising the second fluid conduit and the fluid scoop; and
a gas turbine engine including the first shaft; and
a device connected to and driven by the second shaft, the device arranged outside of the gas turbine engine.

2. The assembly of claim 1, wherein
the fluid scoop is adapted to direct fluid, within the annular plenum, into the second fluid conduit; and
the annular plenum is adapted to receive the fluid therewithin from the first fluid conduit.

3. The assembly of claim 1, wherein the fluid scoop is arranged at an inlet of the second fluid conduit.

4. The assembly of claim 1, wherein the fluid scoop has a tubular body with a beveled edge portion.

5. The assembly of claim 4, wherein the fluid scoop further has a projection that projects out from the tubular body and into a slot in the hub.

6. The assembly of claim 1, wherein
the first fluid conduit extends radially within the stationary structure to an outlet orifice in a radial inner surface of the stationary structure;
the second fluid conduit extends radially within the rotating structure to an inlet orifice in a radial outer surface of the rotating structure; and
the annular plenum extends radially from the radial inner surface to the radial outer surface.

7. The assembly of claim 1, further comprising a fluid nozzle configured and rotatable with the rotating structure, the fluid nozzle fluidly coupled with an outlet of the second fluid conduit.

8. The assembly of claim 1, wherein the rotating structure is further configured with a third fluid conduit and a second fluid scoop for the third fluid conduit, the third fluid conduit is fluidly coupled with the first fluid conduit through the annular plenum, and the second fluid scoop projects radially into the annular plenum.

9. The assembly of claim 8, further comprising a fluid device fluidly coupled with the second fluid conduit and the third fluid conduit.

10. The assembly of claim 1, wherein the hub further comprises a fluid nozzle fluidly coupled with an outlet of the second fluid conduit.

11. The assembly of claim 1, wherein the rotating structure further comprises a first rotating assembly that includes the first shaft and a rotor configured with a plurality of rotor blades.

12. The assembly of claim 1, further comprising:
a gas turbine engine including the first shaft; and
a transmission connected to the second shaft.

13. The assembly of claim 12, further comprising a generator driven by the second shaft through the transmission.

14. The assembly of claim 1, further comprising a seal device adapted to seal an annular gap between the stationary structure and the rotating structure.

15. The assembly of claim 14, wherein the seal device comprises an O-ring.

16. The assembly of claim 14, further comprising a second seal device adapted to seal a second annular gap between the stationary structure and the rotating structure, wherein the annular plenum is located axially, relative to a rotational axis of the rotating structure, between the seal device and the second seal device.

17. An assembly for rotational equipment, comprising:
a stationary structure configured with a first fluid conduit;
a hub comprising a hub base, a second fluid conduit and a fluid scoop at an inlet of the second fluid conduit, the second fluid conduit fluidly coupled with the first fluid conduit through an annular plenum that extends radially from the hub to the stationary structure, and the fluid scoop projecting radially out from the hub base and into the annular plenum, wherein the fluid scoop is adapted to direct fluid, which is received within the annular plenum from the first fluid conduit, into the second fluid conduit; and
a first shaft and a second shaft, the first shaft connected to the second shaft through the hub; and
a gas turbine engine including the first shaft; and
a device connected to and driven by the second shaft, the device arranged outside of the gas turbine engine.

18. The assembly of claim 17, wherein the scoop fluidly divides the annular plenum into a pair of circumferentially adjacent sub-plenums.

* * * * *